United States Patent
Goyal et al.

(10) Patent No.: US 12,022,567 B2
(45) Date of Patent: Jun. 25, 2024

(54) CELLULAR WIRELESS SERVICE PREFERENCES TRANSFER

(71) Applicant: Apple Inc., Cupertino, CA (US)

(72) Inventors: Anish Kumar Goyal, Milpitas, CA (US); Li Li, Los Altos, CA (US); Raj S. Chaugule, Santa Clara, CA (US); Vladimir M. Appel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/353,720

(22) Filed: Jul. 17, 2023

(65) Prior Publication Data

US 2023/0396989 A1 Dec. 7, 2023

Related U.S. Application Data

(63) Continuation of application No. 17/806,464, filed on Jun. 10, 2022, now Pat. No. 11,706,609, which is a continuation of application No. 16/926,625, filed on Jul. 10, 2020, now Pat. No. 11,363,449.

(60) Provisional application No. 62/873,683, filed on Jul. 12, 2019.

(51) Int. Cl.
  *H04W 8/20* (2009.01)
  *H04W 8/18* (2009.01)
  *H04W 12/71* (2021.01)
  *H04W 88/02* (2009.01)

(52) U.S. Cl.
  CPC ........... *H04W 8/205* (2013.01); *H04W 8/183* (2013.01); *H04W 12/71* (2021.01); *H04W 88/02* (2013.01)

(58) Field of Classification Search
  CPC ..... H04W 8/205; H04W 12/71; H04W 8/183; H04W 88/02
  USPC ........................................................ 455/558
  See application file for complete search history.

(56) References Cited

U.S. PATENT DOCUMENTS

| | | |
|---|---|---|
| 6,178,181 B1 | 1/2001 | Glitho |
| 9,913,127 B1 | 3/2018 | Polepalli |
| 10,805,427 B1 | 10/2020 | Eddings et al. |
| 2004/0092248 A1 | 5/2004 | Kelkar et al. |
| 2005/0075106 A1 | 4/2005 | Jiang |
| 2005/0149204 A1 | 7/2005 | Manchester et al. |
| 2005/0209986 A1 | 9/2005 | Pedersen |
| 2006/0154659 A1 | 7/2006 | Roter et al. |

(Continued)

*Primary Examiner* — Mark G. Pannell
(74) *Attorney, Agent, or Firm* — DICKINSON WRIGHT RLLP

(57) ABSTRACT

Apparatus and methods to transfer user preferences for cellular wireless service associated credentials transferred from a source device to a target device. Transfer of credentials can include physically moving a physical subscriber identity module (SIM) card between devices, transfer of cellular wireless service from a first SIM card at the source device to a second SIM card at the target device, and/or transfer of cellular wireless services for one or more electronic SIMs (eSIMs) from the source device to the target device. Preferences associated with some or all of the transferred SIMs/eSIMs can be applied at the target device when certain matching criteria are satisfied. Exemplary matching criteria include matching identifiers, such as integrated circuit card identifier (ICCID) values, mobile station international subscriber directory number (MSISDN) values, and/or mappings thereof. Transfer of preferences can occur via a local peer-to-peer connection, a secure cloud-based service, and/or a backup and restore process.

20 Claims, 12 Drawing Sheets

(56) References Cited

U.S. PATENT DOCUMENTS

| | | |
|---|---|---|
| 2008/0032742 A1 | 2/2008 | Celik et al. |
| 2008/0277482 A1 | 11/2008 | Parlange et al. |
| 2009/0040947 A1 | 2/2009 | Krivopaltsev |
| 2009/0061840 A1 | 3/2009 | Fleischman et al. |
| 2009/0098875 A1 | 4/2009 | De Beer |
| 2009/0298505 A1 | 12/2009 | Drane et al. |
| 2010/0311391 A1 | 12/2010 | Siu et al. |
| 2011/0164511 A1 | 7/2011 | Poon et al. |
| 2011/0238792 A1 | 9/2011 | Phillips et al. |
| 2012/0314919 A1 | 12/2012 | Sparks et al. |
| 2012/0322429 A1 | 12/2012 | Chien |
| 2013/0225239 A1 | 8/2013 | Wu et al. |
| 2013/0227541 A1 | 8/2013 | Shadeck et al. |
| 2015/0017962 A1 | 1/2015 | Howard et al. |
| 2015/0098101 A1 | 4/2015 | Asakawa |
| 2015/0281929 A1 | 10/2015 | Shih et al. |
| 2015/0339736 A1 | 11/2015 | Bennett |
| 2016/0234675 A1 | 8/2016 | Ghoshal et al. |
| 2017/0127214 A1 | 5/2017 | Sohn et al. |
| 2022/0377531 A1 | 11/2022 | Goyal et al. |

300

Source Device Preferences Updates

| pSIM State Change | Update Preferences Cache? |
|---|---|
| Insert UICC/pSIM | YES |
| Remove UICC/pSIM (unresolved) | NO |
| Remove UICC/pSIM (resolved) | YES |
| Disable pSIM | NO |

| eSIM State Change | Update Preferences Cache? |
|---|---|
| Enable eSIM | YES |
| Delete eSIM (unresolved) | NO |
| Delete eSIM (resolved) | YES |
| Disable eSIM | NO |

*FIG. 3*

CELLULAR WIRELESS SERVICE PREFERENCES TRANSFER

CROSS-REFERENCE TO RELATED APPLICATIONS

The present application is a continuation of U.S. patent application Ser. No. 17/806,464, entitled "CELLULAR WIRELESS SERVICE PREFERENCES TRANSFER," filed Jun. 10, 2022, issued Jul. 18, 2023 as U.S. Pat. No. 11,706,609, which is a continuation of U.S. patent application Ser. No. 16/926,625, entitled "CELLULAR WIRELESS SERVICE PREFERENCES TRANSFER," filed Jul. 10, 2020, issued Jun. 14, 2022 as U.S. Pat. No. 11,363,449, which claims the benefit of U.S. Provisional Application No. 62/873,683, entitled "CELLULAR SERVICE PREFERENCES TRANSFER," filed Jul. 12, 2019, the contents of all of which are incorporated by reference herein in their entirety for all purposes.

FIELD

The described embodiments relate to wireless communications, including methods and apparatus to support transfer of user preferences associated with credentials for cellular wireless services, such as cellular voice and data services authorized by subscriber identity modules (SIMs) and/or electronic SIM (eSIMs), between wireless devices.

BACKGROUND

Newer generation, e.g., fourth generation (4G) and fifth generation (5G), cellular wireless networks employing newer radio access technology that implements one or more $3^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services for both voice and data in parallel. A user of a wireless device can access services offered by a wireless network service provider, also referred to as a mobile network operator (MNO), based on cellular wireless service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC for access to different cellular wireless services. Wireless devices that accommodate multiple UICCs/SIMs and/or multiple eSIMs on an eUICC provide for multiple subscriber identities to be used by the same wireless device to access different cellular wireless services, including cellular wireless services that can span different cellular wireless networks that use different cellular wireless radio access technologies (RATs). A user can transfer cellular wireless service accounts associated with one or more SIMs/eSIMs between wireless devices. Preferences that are locally managed at the wireless devices may not transfer automatically between the wireless devices, as cellular wireless service providers may lack knowledge of user preferences for the multiple SIMs/eSIMs on a wireless device. There exists a need for mechanisms to allow a user to transfer cellular wireless service preferences associated with SIMs/eSIMs between wireless devices.

SUMMARY

This Application describes cellular wireless service preferences transfer mechanisms that can be used to move user preferences associated with cellular wireless service credentials, e.g., SIMs and/or eSIMs, between wireless devices under various scenarios. To simplify configuration and reuse of a cellular wireless service on another wireless device, a user can seek to transfer preferences associated with one or more SIMs/eSIMs from a source device to a target device when transferring (or after transferring) the one or more SIMs/eSIMs between the source device and the target device. Transfer of cellular wireless service credentials and associated user preferences can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of cellular wireless service credentials and associated preferences can also occur via an online network-based service, such as via an iCloud® service, where the devices need not be in proximity to each other. Transfer of preferences that are associated with cellular wireless service credentials can also occur via a backup and restore mechanism to and from local or remote storage. A user can customize preferences for the use of cellular wireless service plans on a wireless device, e.g., through a settings or configuration menu, where the preferences can be locally stored on the wireless device separately from the credentials (SIMs/eSIMs) for the cellular wireless service plans. For SIMs/eSIMs that are transferred from a source device to a target device, the user can seek to re-apply the same preferences for the set of SIMs/eSIMs that are transferred on the target device as were used on the source device. Applying the same preferences (or a subset thereof) at the target device can occur i) as part of a cellular wireless service credential transfer process, ii) after transfer of the cellular wireless service credentials, or iii) as part of a backup and restore procedure. Reapplication of the same user preferences for cellular wireless service at a target device can depend on whether application of the preferences is feasible on the target device, such as based on a configuration of SIMs/eSIMs on the target device as compared to a configuration of SIMs/eSIMs on the source device. In some embodiments, when a target device and source device have matching configurations of SIMs/eSIMs, cellular wireless service preferences for the set of transferred SIMs/eSIMs can automatically be transferred with minimal or no user input required. In some embodiments, when a target device and source device have non-matching configurations of SIMs/eSIMs, application of cellular wireless service preferences for some or all of the set of transferred SIMs/eSIMs can include presentation of an appropriate user interface (UI) to assist with the transfer of the preferences and/or with the configuration of preferences for one or more of the transferred SIMs/eSIMs at the target device. In some embodiments, transfer of cellular wireless service preferences for a SIM/eSIM from a source device to a target device can depend on whether the transferred SIM/eSIM will be associated with an identical unique cellular wireless service number at the target device as used at the source device, e.g., a same mobile station international subscriber directory number (MSISDN), also referred to as a phone number for a mobile wireless device. In some embodiments, transfer of cellular wireless service preferences for a transferred SIM/eSIM can be based on whether the SIM/eSIM at the target device matches the corresponding SIM/eSIM at the source device based on an identifier and/or a mapping of identifiers for the SIM s/eSIMs. Matching of SIMs/eSIMs can be based on MSISDN values or integrated circuit card identifier (ICCID) values and/or mappings thereof.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 3 illustrates a set of tables of exemplary user actions that can cause an update of cached preferences for SIMs/eSIMs at a source device, according to some embodiments.

DETAILED DESCRIPTION

Figure 1:
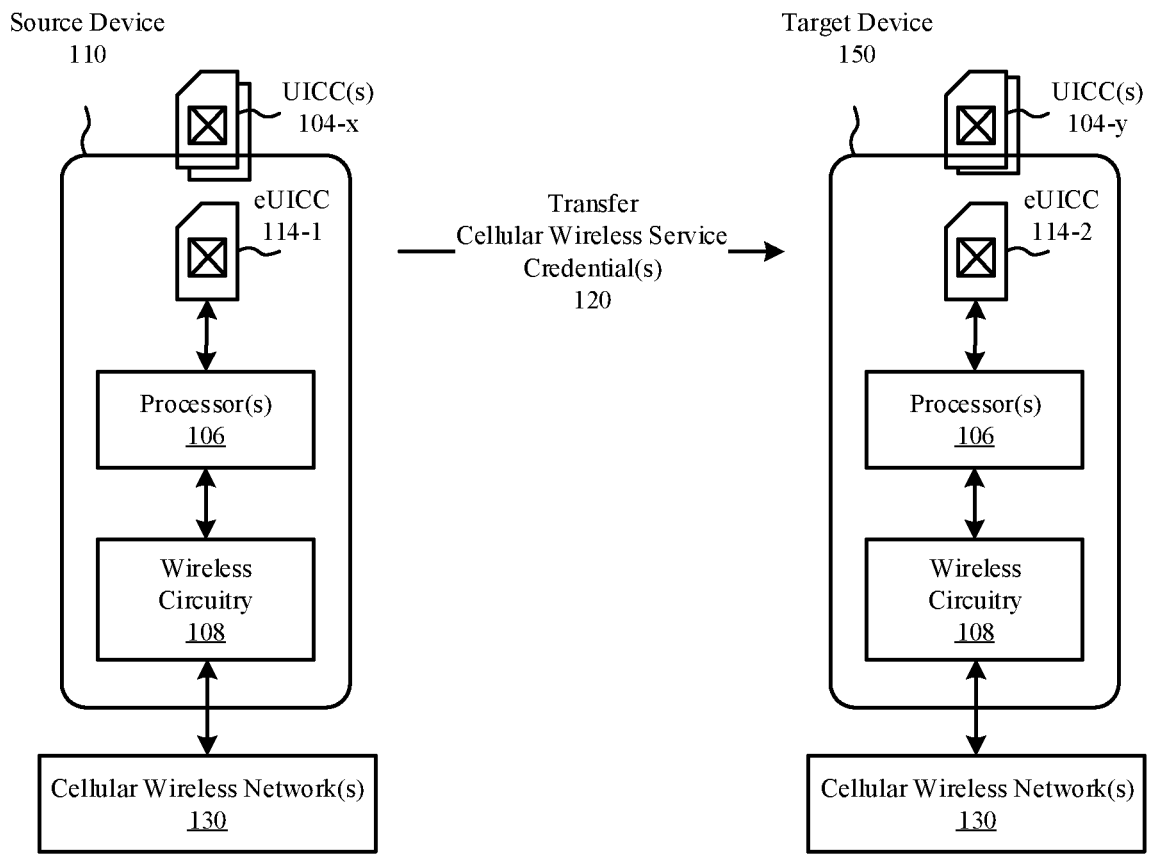
FIG. 1 illustrates a diagram of an exemplary transfer of cellular wireless service account credentials for access to cellular wireless services from a source device to a target device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capabilities continue to be incorporated into a broad array of electronic devices, including mobile phones, tablets, portable computers, wearable devices, automobiles, etc. Additionally, credentials for access to cellular wireless services are evolving from removable secure Universal Integrated Circuit Cards (UICCs), also referred to as subscriber identity module (SIM) cards, to include electronic SIMs (eSIMs) that can be installed and updated dynamically on secure system boards, such as embedded UICCs (eUICCs). A user can own and use multiple different electronic devices that each have cellular wireless capabilities and can seek to re-use cellular wireless service features and/or settings across multiple cellular-capable electronic devices. For example, when acquiring a new cellular-capable electronic device, a user can seek to transfer cellular wireless service credentials from an existing device to the new device in as flexible and efficient a manner as possible. Alternatively, a user can move a physical SIM card between wireless devices and/or transfer an eSIM between wireless devices to use cellular wireless services associated with the physical SIM card and/or the eSIM on another wireless device. While cellular wireless service accounts are managed by cellular wireless service providers, user preferences for how cellular wireless services are used on a wireless device can be locally configured at the wireless device. Transfer of a cellular wireless service account by a cellular wireless service provider may occur without knowledge of the user's specific preferences on how the cellular wireless service is configured for use on the wireless device from which the cellular wireless service account is transferred. To simplify configuration and re-use of a cellular wireless service on another wireless device, a user can seek to transfer preferences associated with one or more SIMs/eSIMs from a source device to a target device when transferring (or after transferring) the one or more SIMs/eSIMs between the source device and the target device.

A user can seek to transfer cellular wireless service credentials and associated user preferences for cellular wireless service associated with the credentials from a first device, which can be referred to as a source device, to a second device, which can be referred to as a target device. In some embodiments, the user can be associated with a user account, e.g., referenced by a unique identifier, such as an Apple ID, maintained by a network-based online cloud storage service, e.g., iCloud®, and can register each of the source device and the target device with the same user account. The user can seek to transfer the cellular wireless service credentials by physically moving a SIM card, e.g., a fourth form factor (4FF) "nano SIM" card, from the source device to the target device, or by moving credentials for a SIM card of the source device to another SIM card (or to an eUICC) of the target device. Alternatively, and/or additionally, the user can seek to transfer credentials in the form of an eSIM included in an eUICC of the source device to an eSIM in an eUICC of the target device. Devices that include an eUICC can usually support multiple eSIMs, and in some instances, the user can seek to transfer a set of one or more eSIMs from a source device to a target device. Some devices can also include a combination of i) one or more removable SIM cards and ii) one or more eSIMs on an eUICC of the device, and the user can seek to transfer a set of some or all of the cellular wireless credentials from the SIM card(s) and/or from the eSIMs on the eUICC of the device to another device.

Transfer of cellular wireless service credentials and associated user preferences can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of cellular wireless service credentials and associated preferences can also occur via an online network-based service, such as via an iCloud® service, where the devices need not be in proximity to each other. Transfer of user preferences that are associated with cellular wireless service credentials that are transferred can also occur via a backup and restore mechanism to and from local or remote storage. In any of these scenarios, transfer of cellular wireless service credentials and/or associated user preferences can include communication between the source device, the target device, and/or one or more network-based servers, which can include mobile network operator (MNO) managed servers, such as an entitlement server, a web-sheet server, an authentication server, a provisioning server, a subscription management data preparation (SMDP+) server, a home subscriber server (HSS), a billing services server (BSS), and/or an authentication server, as well as third-party managed servers, such as a cloud storage service server, a push notification services server, a discovery service server, and/or an store-and-forward message server.

A user can customize preferences for the use of cellular wireless service plans on a mobile device, e.g., through a settings or configuration menu, where the preferences can be locally stored on the mobile device separately from the credentials (SIMs/eSIMs) for the cellular wireless service plans. Exemplary preferences can include settings for data roaming, Voice over LTE (VoLTE), messaging services (such as iMessage®), video calling services (such as FaceTime®), Wi-Fi calling, restricted data rate modes, and the like. Additional preferences can include a selection of one or more SIMs/eSIMs from multiple SIMs/eSIMs as to which is/are preferred for voice services and/or data services. In some embodiments, one SIM/eSIM of multiple SIMs/eSIMs can be preferred for mobile-originated voice calls and the same or another SIM/eSIM of the multiple SIMs/eSIMs can be preferred for data connections. A user can also maintain a list of contacts on the mobile device and can associate with one or more contacts a SIM/eSIM to use for particular services when communicating with that contact. Each SIM/eSIM can be assigned a label by the user, and each contact can be associated by the user with one of the assigned SIM/eSIM labels.

For SIMs/eSIMs that are transferred from a source device to a target device, the user can seek to apply the same preferences for the set of SIMs/eSIMs that are transferred on the target device as were used on the source device. Applying the same preferences (or a subset thereof) at the target device can occur i) as part of the transfer process, ii) after the transfer process occurs, or iii) as part of a backup and restore procedure. Reapplication of the same preferences at a target device can depend on whether application of the same preferences is feasible on the target device, such as based on a configuration of SIMs/eSIMs on the target device as compared to a configuration of SIMs/eSIMs on the source device. In some embodiments, when a target device and source device have matching configurations of SIMs/eSIMs, preferences for the set of transferred SIMs/eSIMs can automatically be transferred with minimal or no user input required. In some embodiments, when a target device and source device have non-matching configurations of SIMs/eSIMs, application of preferences at the target device for some or all of the set of transferred SIMs/eSIMs can include presentation of an appropriate user interface (UI) to assist with the transfer of the preferences and/or with the configuration of preferences for one or more of the transferred SIMs/eSIMs at the target device. In some embodiments, preferences for a SIM/eSIM transferred from a source device to a target device can depend on whether the transferred SIM/eSIM will be associated with an identical unique identifier, such as a cellular wireless service number at the target device being the same as used at the source device, e.g., a same mobile station international subscriber directory number (MSISDN), also referred to as a phone number for a mobile device, or based on an integrated circuit card identifier (ICCID) value for a physically transferred SIM being the same. Transfer of a physical SIM from a source device to a target device maintains an identical phone number and identical ICCID value, while transfer of an eSIM may result in the same MSISDN at the target device as used at the source device. In some scenarios a user may seek to transfer a cellular wireless service account from a first phone number at the source device to a second phone number at the target device and use the same preferences for the second phone number at the target device as used for the first phone number at the source device. In some embodiments, an applicable UI can be presented to the user to confirm transfer of preferences between different SIMs/eSIMs from a source device to a target device. In some embodiments, a subset of preferences, such as associations of contacts to SIM/eSIM labels can transfer, while another subset of preferences, such as a voice preference or data preference among a set of SIMs/eSIMs may not transfer and require further user input.

These and other embodiments are discussed below with reference to FIGS. 1 through 6; however, those skilled in the art will readily appreciate that the detailed description given herein with respect to these figures is for explanatory purposes only and should not be construed as limiting.

FIG. 1 illustrates a diagram 100 of an exemplary transfer 120 of cellular wireless service credentials for access to cellular wireless services from a source device 110 to a target device 150 where the source device 110 and the target device 150 may be within proximity of each other to establish a direct secure connection between them or may be separated by a physical distance where transfer occurs via an indirect connection, such as over a wireless local area network (WLAN) and/or via one or more cellular wireless networks 130. Transfer of credentials that permit access to services of cellular wireless networks 130 includes the transfer of one or more subscriber identify modules (SIMs) on UICCs 104 and/or the transfer of one or more virtual cellular wireless service credentials, such as one or more electronic subscriber identity modules (eSIMs), also referred to as profiles or plans herein, from a source device 110 to a target device 150. For example, a UICC 104-x of the source device 110 can be physically removed from the source device 110 and inserted into the target device 150. Alternatively, one or more eSIMs may be initially present on the eUICC 114-1 and/or on the UICC 104-x of the source device 110, and a user may seek to transfer one or more of the eSIMs from the source device 110 to the eUICC 114-2 and/or to the UICC 104-y of the target device 150. The eSIMs may be associated with one or more cellular wireless service accounts for one or more cellular wireless service providers, also referred to as mobile network operators (MNOs). Transfer of eSIMs may occur without requiring the user to remove the UICC 104 from the source device 110 or to replace the UICC 104 of the target device 150. The source device 110 and the target device 150 can each include one or more processors 106 and wireless circuitry 108 to communicate with one or more cellular wireless networks 130. The SIMs and/or eSIMs that are transferred can allow the target device 150 to access cellular wireless services for one or more cellular wireless networks 130 that previously were accessible by the source device 110. Preferences for use of the SIMs/eSIMs as configured by a user at the source device 110 can be re-applied, at least in part, at the target device 150, in some embodiments, as described further herein.

Figure 2:
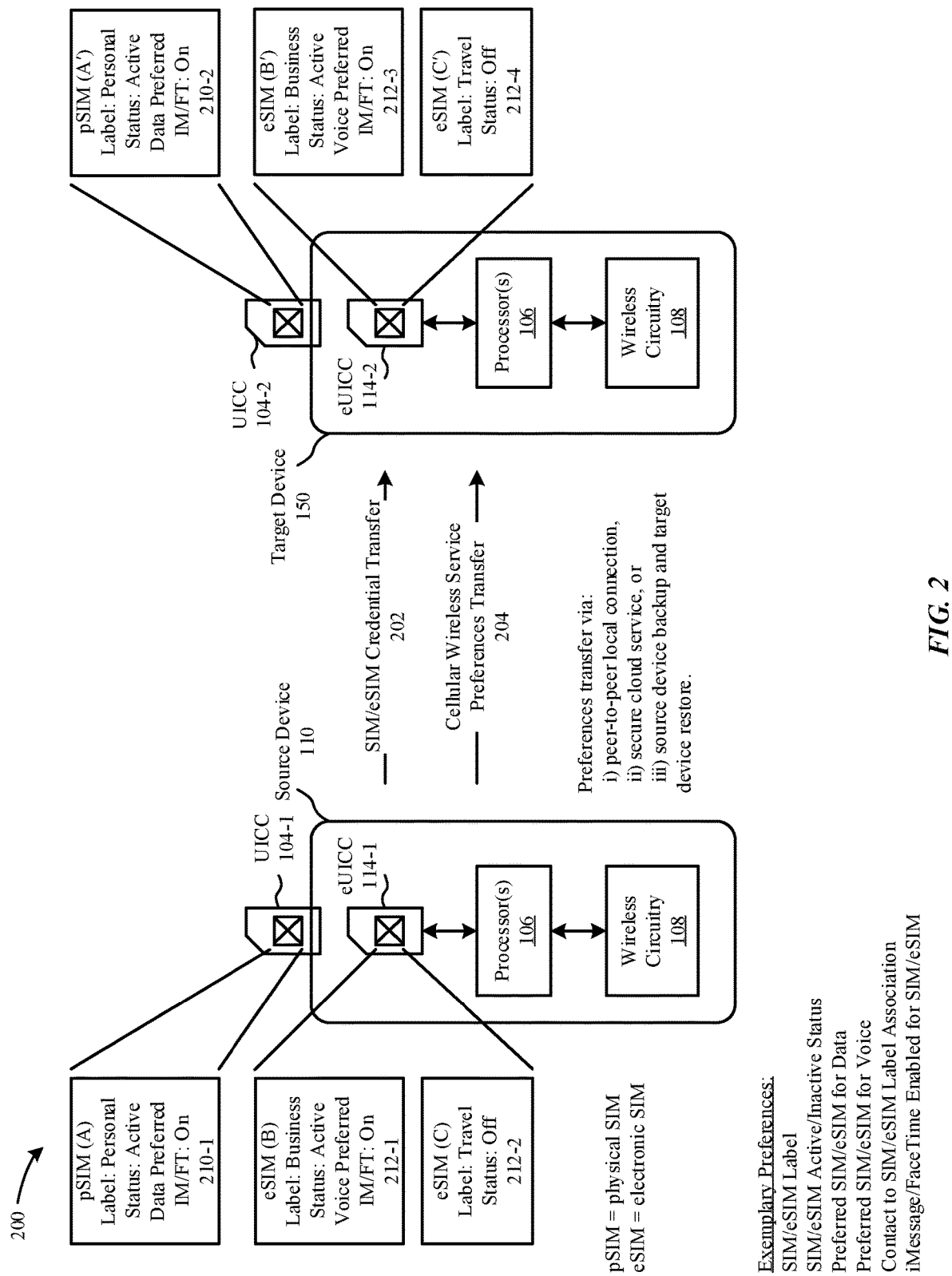
FIG. 2 illustrates a diagram of an exemplary transfer of SIM/eSIM credentials and transfer of associated preferences from a source device to a target device, according to some embodiments.

FIG. 2 illustrates a diagram 200 of an example of a transfer 202 of SIM/eSIM credentials and a transfer 204 of associated preferences for the transferred SIM/eSIM credentials from a source device 110 to a target device 150. The source device 110 includes a removable UICC 104-1, which includes a physical SIM (pSIM) 210-1 associated with a unique integrated circuit card identifier (ICCID) value "A", and a non-removable eUICC 114-1, which includes eSIM 212-1 associated with a unique ICCID value "B" and eSIM 212-2 associated with a unique ICCID value "C". A user can seek to transfer the set of credentials pSIM(A) 210-1, eSIM(B) 212-1, and eSIM(C) 212-2 from the source device 110 to the target device 150. The target device 150 includes a removable UICC 104-2, which includes a physical SIM (pSIM) 210-2 associated with a unique ICCID value "A'" and a non-removable eUICC 114-2, which includes eSIM 212-3 associated with a unique ICCID value "B'" and eSIM 212-4 associated with a unique ICCID value "C'". In some embodiments, the UICC 104-2 of the target device can be the same as the UICC 104-1 of the source device, e.g., when the user physically transfers the UICC 104-1 from the source device 110 to the target device 150, in which case ICCID value "A'"=ICCID value "A". In some embodiments, the UICC 104-2 of the target device 150 and the UICC 104-1 of the source device 110 are distinct, and the user transfers cellular wireless service for the associated pSIM(A) 210-1 from the UICC 104-1 of the source device 110 to an associated pSIM(A') 210-2 of the UICC 104-2 at the target device 150. The user can also transfer cellular wireless service for one or more both of eSIM(B) and eSIM(C) from the eUICC 114-1 of the source device 110 to eSIM(B') and eSIM(C') respectively on the eUICC 114-2 of the target device 150. FIG. 1 further illustrates exemplary user preferences for pSIM(A), eSIM(B), and eSIM(C) at the source device 110 prior to transfer of cellular wireless service for the SIMs/eSIMs to the target device 150. Each SIM/eSIM can include a distinct label, e.g., "Personal", "Business", "Travel", or the like, and a status/state value, e.g., "On/Active" or "Off/Inactive". Additionally, a SIM/eSIM can be designated as preferred for mobile-originated cellular voice service connections, while the same or another SIM/eSIM can be designated as preferred for cellular data service connections. Further, a user can indicate whether a SIM/eSIM can be used with particular applications, such as for messaging services, such as iMessage®, or for video calling services, such as FaceTime®. In some embodiments, at most one eSIM of multiple eSIMs on an eUICC 114 can be on/active at a time. In some embodiments, a voice preference and/or a data preference can be applied to only one of multiple SIMs/eSIMs that are on/active on a device. As part of the transfer 202 of cellular wireless service for the SIMs/eSIMs of the source device 110 to the target device 150, the user can also seek to transfer 204 the preferences associated with the transferred SIMs/eSIMs. As illustrated in FIG. 2, the preferences for pSIM(A) from the source device 110 can be applied as preferences for a corresponding pSIM(A') at the target device 150. Similarly, preferences for eSIM(B) and eSIM(C) from the source device 110 can be re-applied as preferences for eSIM(B') and eSIM(C') at the target device 150. In some embodiments, transfer 204 of the preferences for the SIMs/eSIMs can occur with the transfer 202 of the SIM/eSIM cellular wireless services. In some embodiments, transfer 304 of the preferences for the SIMs/eSIMs can occur separately from (e.g., after) transfer 202 of the SIM/eSIM cellular wireless services. Additional preferences that are not explicitly illustrated in FIG. 2 can also be reapplied at the target device 150 for the transferred SIMs/eSIMs, such as label-contact mappings, data roaming settings, Wi-Fi calling settings, data mode settings, etc.

Transfer of the preferences can occur i) via a direct peer-to-peer local connection between the source device 110 and the target device 150, e.g., during initial setup of the target device 150, ii) via an indirect connection, such as using a secure network-based cloud storage service, e.g., during initial setup or subsequent configuration of the target device 150, or iii) via a backup of a configuration of the source device 110 and a subsequent restoration of the backed up configuration at the target device 150. Preferences for SIMs/eSIMs can be cached at the source device 110 and be updated at the source device 110 based on user interaction at the source device 110. The cached set of preferences can be stored separately from, e.g., external to the UICC/eUICC 104-1/114-1 of the source device 110, the credentials for the cellular wireless service account(s), which are generally securely stored on the UICC/eUICC 104-1/114-1 of the source device 110.

FIG. 3 illustrates a set of tables 300 of exemplary user actions that can cause an update of cached preferences of SIMs/eSIMs at the source device 110. A source device 110 can include one or more slots for UICCs 104. Responsive to insertion of a UICC 104 in the source device 110, where the UICC 104 includes an installed SIM that may have been activated on the UICC 104, a preferences cache for the source device 110 can be updated. In some embodiments, a user can enter preferences for a newly installed SIM via a UI of the source device 110, and the preferences cache can be updated accordingly. In some embodiments, upon removal of a UICC 104 from the source device 110, the preferences cache of the source device 110 can be not updated while the status of the removed UICC 104 (and of SIM/eSIMs installed thereon) remains unresolved. A user can temporarily remove the UICC 104 from the source device 110 and subsequently re-insert the UICC 104 in the source device 110. To avoid loss of associated user preferences for the SIM of the UICC 104, the cached preferences can be not updated until resolution of a status for the UICC 104, e.g., based on an indication by the user that the SIM of the removed UICC 104 should be disassociated from the source device 110. A user can also temporarily disable a SIM of the UICC 104, and while disabled, the preferences cache that includes preferences for the disabled SIM may be not updated, as a user may subsequently re-enable the disabled SIM for use on the device.

Just as with changing states of SIMs on UICCs 104, a user of the source device 110 can also change a state of an eSIM on the eUICC 114 of the source device 110. In some embodiments, when an eSIM is enabled, a preferences cache can be updated, such as when a new eSIM is installed on the eUICC 114 or when a previously installed, but inactive eSIM is activated on the eUICC 114. In some embodiments, preferences for the enabled eSIM are entered by a user via a user interface of the source device 110. In some embodiments, preferences for the enabled eSIM are retained from a configuration in which the enabled eSIM was previously used on the eUICC 114 of the source device 110. In some embodiments, some preferences for the enabled eSIM may be already included in the cached preferences and only the state of the enabled eSIM needs to be updated. Deletion of an eSIM, however, will not cause the preferences cache to be updated until a state for the eSIM is resolved, e.g., by a user indication that the eSIM should be permanently deleted. This avoids accidental erasure of the preferences for an eSIM until confirmation is received. In some embodiments, only one eSIM on the eUICC 114 is enabled at one time, and one or more eSIMs can be disabled on the eUICC 114. Preferences for the disabled eSIMs can be retained for later use when the eSIMs are enabled. Thus, when the disabled eSIM of the eUICC 114 is later re-enabled, the preferences for use of the eSIM on the eUICC 114 are retained. In some embodiments, a state of an eSIM, e.g., "Active/On" and "Inactive/Off" can be updated based on whether the eSIM is enabled or disabled, while other associated preferences for the eSIM remain unchanged. Additional actions that can change preferences, such as changes to a setting via a user interface of the source device 110, are not shown explicitly in the tables of FIG. 3; however, some of such additional actions can also cause cached preferences to be updated at the source device 110. Cached preferences for one or more SIMs/eSIMs can be transferred from the source device 110 to the target device 150 in conjunction with transfer of cellular wireless service for the one or more SIMs/eSIMs.

Figure 4A:
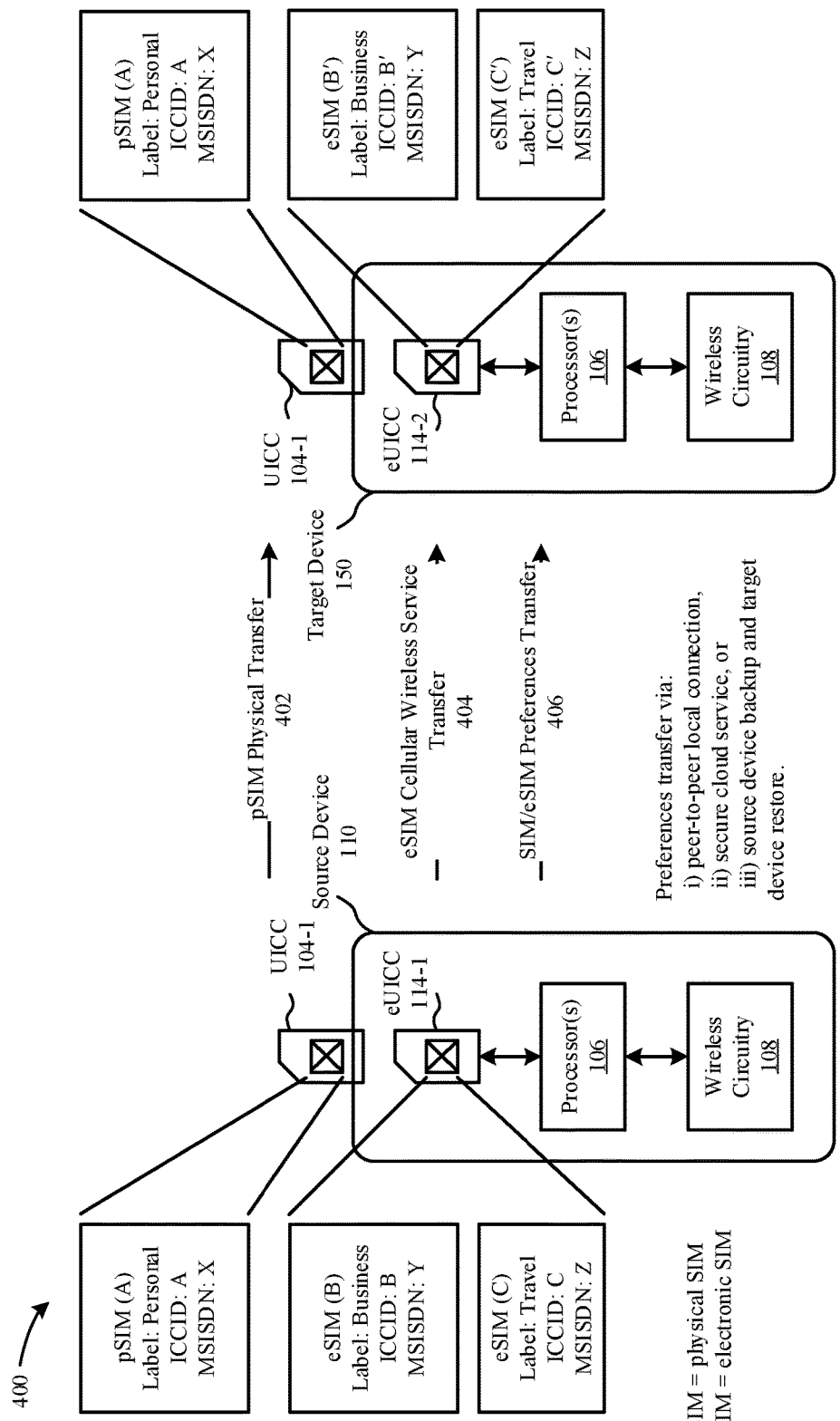
FIGS. 4A through 4E illustrate exemplary scenarios in which cached preferences for SIMs/eSIMs are transferred from a source device 110 and re-applied at a target device 150 in conjunction with transfer of the SIMs/eSIMs, according to some embodiments.

FIGS. 4A through 4E illustrate exemplary scenarios in which cached preferences for SIMs/eSIMs are transferred from a source device 110 and re-applied at a target device 150 in conjunction with transfer of the SIMs/eSIMs. FIG. 4A illustrates a diagram 400 in which a user seeks to transfer cellular wireless service for a physical SIM having an ICCID value of "A", labeled as pSIM(A), and cellular wireless services for two eSIMs having ICCID values of "B" and "C" respectively, labeled as eSIM(B) and eSIM(C) from the source device 110 to the target device 150. The user can also seek to transfer preferences that are associated with the transferred SIM/eSIMs from the source device 110 to the target device 150. At 402, the user can physically transfer pSIM(A) from the source device 110 to the target device 150. At 404, the user can transfer cellular wireless services for eSIM(B) and eSIM(C) from the source device 110 to the target device 150. In some embodiments, transfer for cellular wireless services for pSIM(A), eSIM(B), and eSIM(C) can be performed together based on input obtained via a user interface of the source device 110 and/or via a user interface of the target device 150, e.g., when initializing or otherwise configuring the target device 150. In some embodiments, both the source device 110 and the target device 150 are registered with a common user account, e.g., based on an Apple ID managed by a third-party server and/or based on a cellular wireless service subscription account managed by an MNO. Transfer of a physical SIM between the source device 110 and the target device 150 can occur before or after initiating transfer of cellular services for one or more of the SIMs/eSIMs of the source device 110 to the target device 150. In some embodiments, a user initiates transfer for cellular wireless services for pSIM(A), eSIM(B), and eSIM(C) and subsequently transfers pSIM(A) from the source device 110 to the target device 150. In some embodiments, a user transfers pSIM(A) from the source device 110 to the target device 150 and subsequently initiates transfer of the cellular wireless services for pSIM(A), eSIM(B), and eSIM(C).

At 406, preferences for the transferred cellular wireless services for pSIM(A), eSIM(B), and eSIM(C) are transferred to and re-applied at the target device 150. Preferences may be transferred i) via a peer-to-peer local connection between the source device 110 and the target device 150, ii) via a secure network-based cloud storage service, e.g., iCloud®, or iii) via a backup of data from the source device 110 and subsequent restoration of the backed up data at the target device 150. In some embodiments, the preferences that are transferred include all or a subset of a set of cached preferences stored at the source device 110. Because UICC 104-1, which contains pSIM(A), is physically transferred, the ICCID value and MSISDN value for pSIM(A) when installed at the target device 150 will be identical to the ICCID value and the MSISDN value for pSIM(A) of the UICC 104-1 when installed at the source device 110. When transferring the cellular wireless services for eSIM(B) and eSIM(C), the user can reuse the same MSISDN for the new eSIMs at the target device 150 as previously used at the source device 110; however, ICCID values for the corresponding eSIMs at the target device 150 will differ from those used at the source device 110. In some embodiments, the transfer of preferences for SIMs/eSIMs from the source device 110 to the target device 150 can be conditionally based on whether the same MSISDN value(s) are used at the target device 150 as were used at the source device 110. In some embodiments, the preferences for how a set of SIMs/eSIMs are used as a whole, e.g., a particular selected SIM/eSIM used for mobile-originated voice connections and/or a particular selected SIM/eSIM used for data connections, can be included in the preferences transfer when all of the set of SIMs/eSIMs are transferred from the source device 110 to the target device 150. In some embodiments, a subset of preferences for SIMs/eSIMs of a source device 110 are transferred to the target device 150 based on which SIMs/eSIMs are transferred, e.g., only preferences for those SIMs/eSIMs that are transferred to the target device 150 are also transferred, while preferences for those SIMs/eSIMs that are not transferred to the target device 150 are not transferred. In some embodiments, a user can indicate, via an interface of the source device 110 and/or via an interface of the target device 150, which SIMs/eSIMs to transfer from the source device 110 to the target device 150. In some embodiments, a user can indicate a mapping of one or more SIMs/eSIMs at the source device 110 for transfer to particular SIMs/eSIMs at the target device 150.

Figure 4B:
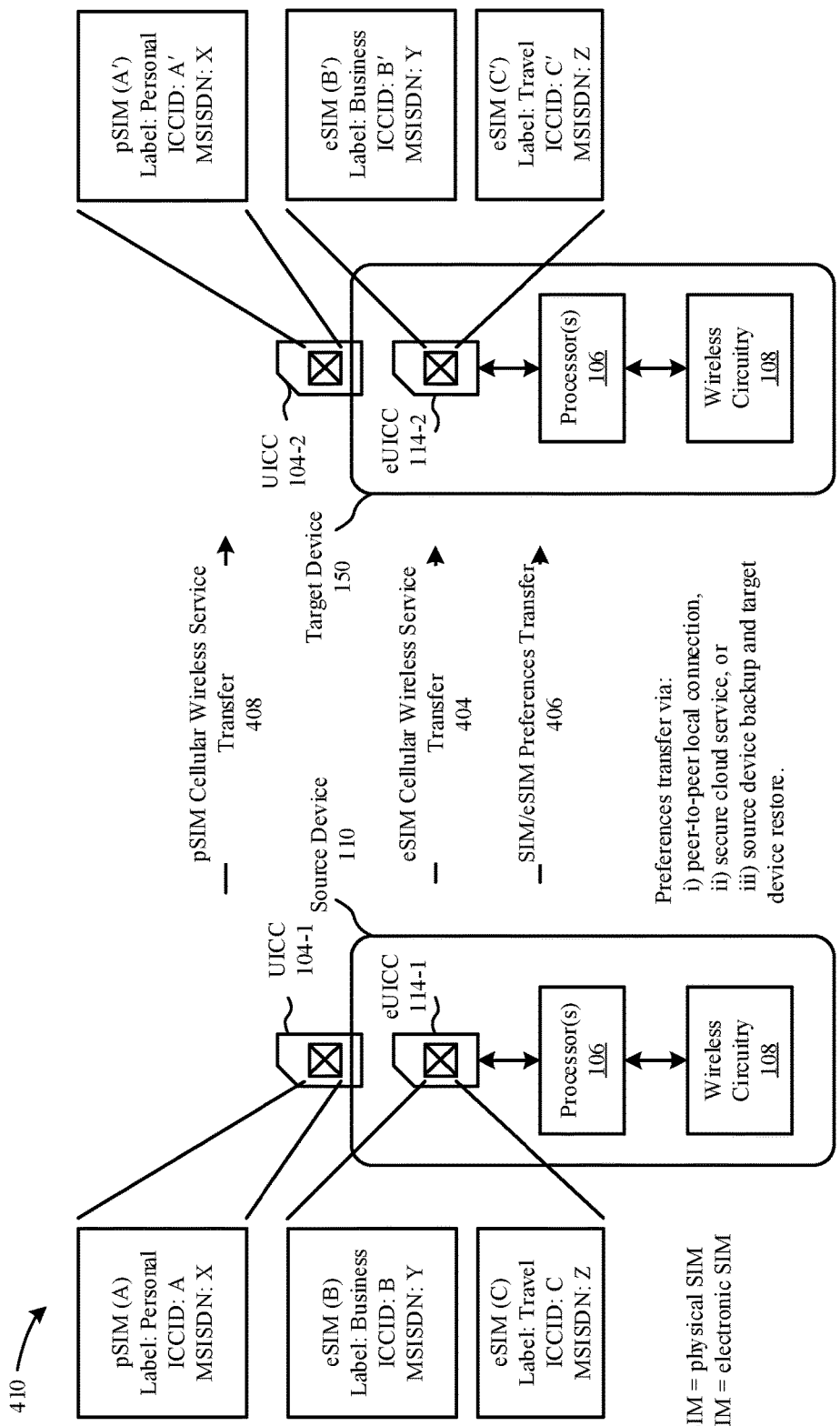

FIG. 4B illustrates a diagram 410 in which a user transfers cellular wireless services for pSIM(A), eSIM(B), and eSIM (C) of the source device 110 to corresponding pSIM(A'), eSIM(B'), and eSIM(C') of the target device 150. At 408, the user transfers cellular wireless service for the physical SIM, e.g., by obtaining and/or configuring UICC 104-2 of the target device 150 to include pSIM(A') having an identical MSISDN value "X" as also used by pSIM(A) of UICC 104-1 of the source device 110. In this scenario, the UICC 104-1 that includes pSIM(A) is not physically transferred from the source device 110 to the target device 150, and instead the cellular wireless service associated with pSIM (A) is transferred to pSIM(A') on UICC 104-2. At 404, the user also transfers cellular wireless services for eSIM(B) and eSIM(C) on eUICC 114-1 of the source device 110 to eSIM(B') and eSIM(C') respectively on eUICC 114-2 of the target device 150. In some embodiments, transfer 408 of cellular wireless service of pSIM(A) to pSIM(A') and transfer 404 of cellular wireless services for the eSIMs occur together in a single, combined transfer, while in some embodiments, transfers for SIMs/eSIMs occur separately from transfers for the physical SIM. At 406, preferences for the SIMs/eSIMs are transferred as described previously for FIG. 4A. In some embodiments, preferences transfer as part of a cellular wireless service transfer process. In some embodiments, preferences transfer separately from the transfer of cellular wireless services. In some embodiments, transfer of preferences occurs conditionally based on whether the set of SIMs/eSIMs at the target device 150 satisfy certain matching criteria. Transfer can be based on whether a configuration of SIMs/eSIMs at the target device 150 and the source device 110 satisfy matching criteria. In some embodiments, a set of SIMs/eSIMs on the target device 150 may match a set of SIMs/eSIMs of the source device 110 indicated for transfer (or by default all of the SIMs/eSIMs of the source device 110 as a complete set) based on unique identifier values, e.g., ICCID values and/or MSISDN values, for the transferred SIMs/eSIMs. In some embodiments, preferences for those SIMs/eSIMs that have matching identifier values can be transferred, while preferences for those SIMs/eSIMs that do not have matching identifier values may not transfer or may require additional user input to transfer. In some embodiments, a user indicates a mapping of SIMs/eSIMs of the source device 110 to corresponding SIMs/eSIMs of the target device 150, and preferences transfer according to the indicated mapping, including, in some embodiments, when identifier values do not match. For example, a user can seek to transfer preferences from one phone number to another phone number, such as from pSIM(A) with MSISDN value "X" at the source device 110 to pSIM(AA) having an ICCID value "AA" and an MSISDN value "XX" that differs from "X" at the target device 150.

Figure 4C:
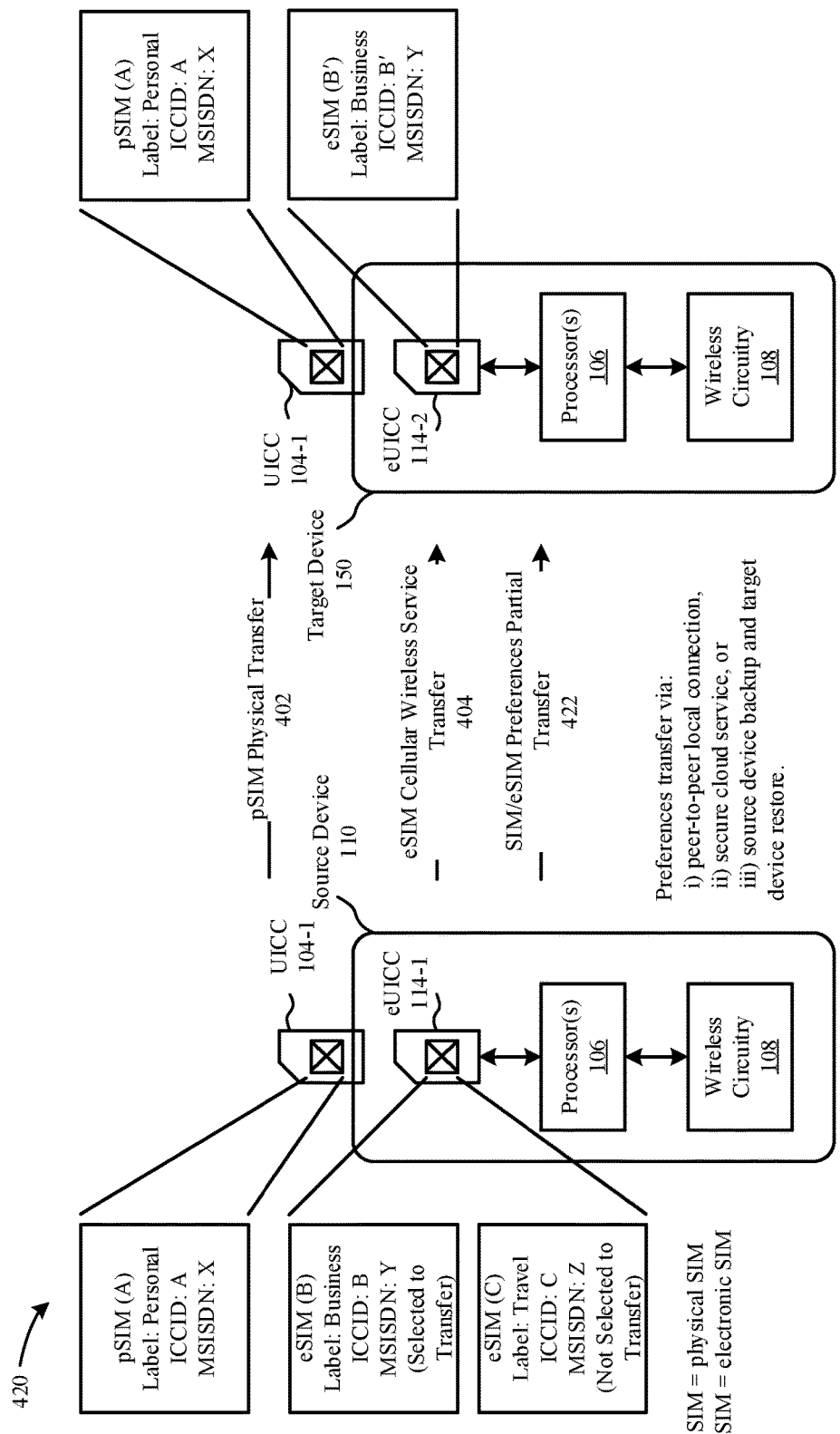

FIG. 4C illustrates a diagram 420 in which a user transfers cellular wireless services and preferences for pSIM(A) and eSIM(B) from the source device 110 to the target device 150 but does not transfer cellular wireless service or preferences for eSIM(C). In some embodiments, selection of which SIM/eSIMs, for which preferences should be transferred, can be based on a comparison of identifiers, e.g., MSISDN values and/or ICCID values, for SIMs/eSIMs at the source device 110 and at the target device 150. In some embodiments, preferences for SIMs/eSIMs, for which identifier values match, will transfer and be re-applied at the target device 150, while preferences for SIMs/eSIMs, for which identifier values do not match, will not transfer or may require additional user input to transfer and be re-applied. FIG. 4C illustrates an example of a partial transfer 422 of SIM/eSIM preferences from a source device 110 to a target device 150. In the example illustrated in FIG. 4C, the UICC 104-1 is physically transferred from the source device 110 to the target device 150, and thus identifiers values, e.g., an ICCID value and an MSISDN value, for pSIM(A) at the target device 150 match the corresponding identifier values for pSIM(A) from the source device 110. As further illustrated in the example of FIG. 4C, eSIM(B) of the source device 110 and eSIM(B') of the target device 150 can share an identical identifier value, e.g., the same MSISDN value, and as such, in some embodiments, preferences for eSIM(B) from the source device 110 are transferred and re-applied to eSIM(B') at the target device 150. In some embodiments, the user selects a subset of SIMs/eSIMs on the source device 110 for transfer to the target device 150. Selection by the user can occur via an interface of the source device 110 and/or via an interface of the target device 150. In some embodiments, physical transfer of the UICC 104-1 between the source device 110 and the target device 150 can indicate that a user seeks to transfer cellular wireless service and preferences for at least a SIM/eSIM on the UICC 104-1 from the source device 110 to the target device 150. In some embodiments, a user can select one or more eSIMs to transfer between a source device 110 and a target device 150 without transferring a physical SIM or a cellular wireless service associated with a physical SIM between the source device 110 and the target device 150. In conjunction with transfer of the eSIMs, preferences associated with some or all of the transferred eSIMs can also transfer and be reapplied to corresponding eSIMs at the target device 150.

Figure 4D:
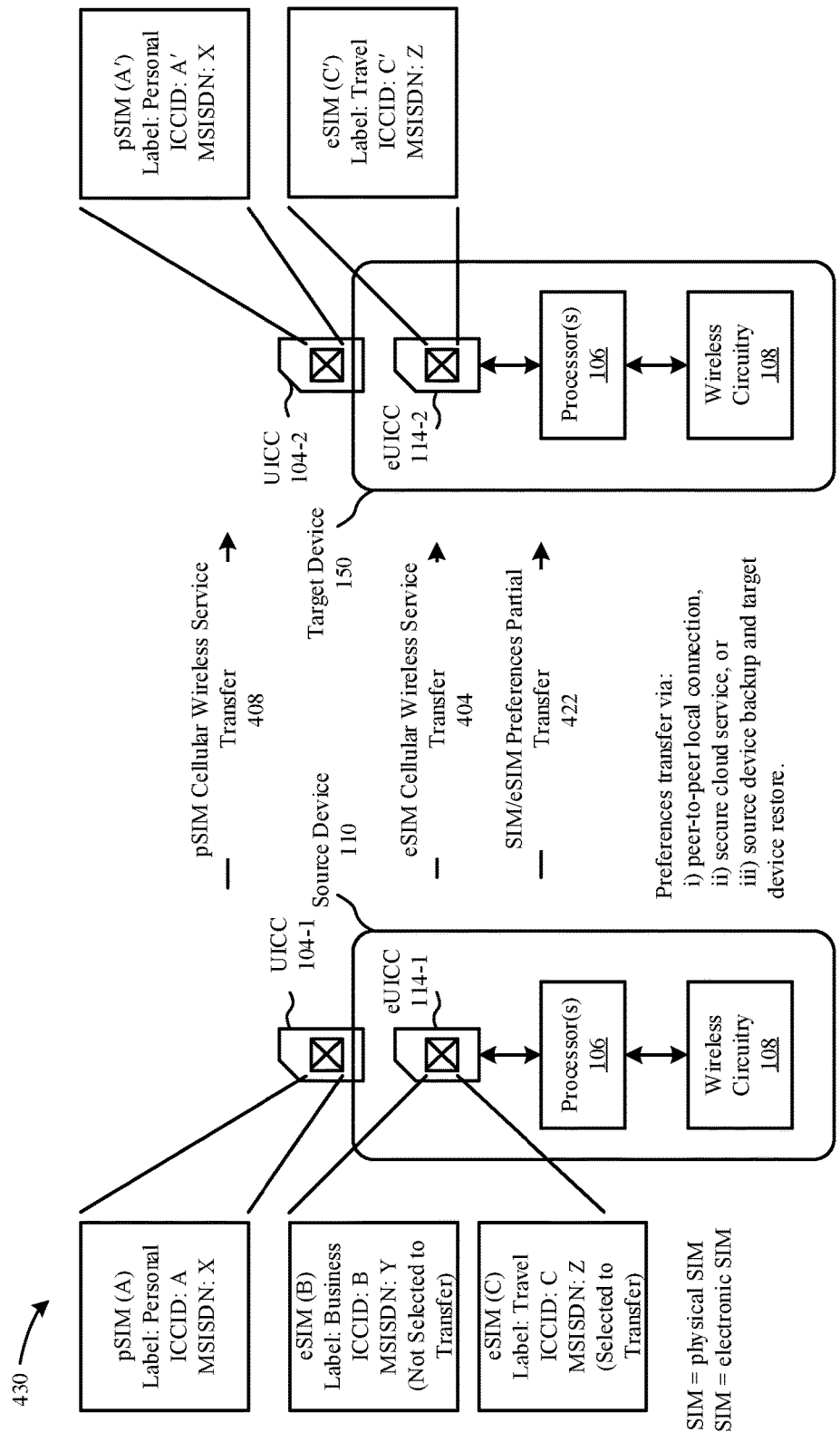

FIG. 4D illustrates a diagram 430 in which a user transfers cellular wireless services and preferences for pSIM(A) and eSIM(C) from the source device 110 to the target device 150 but does not transfer cellular wireless service or preferences for eSIM(B). In some embodiments, a user obtains or configures UICC 104-2 of the target device 150 to include pSIM(A') having an identical MSISDN value ("X") to pSIM(A) of UICC 104-1 of the source device 110. With identical MSISDN values, transfer of preferences for pSIM (A) to pSIM(A') can occur concurrent with or subsequent to transfer of cellular wireless service associated with pSIM(A) from the source device 110 to the target device 150. Additionally, cellular wireless service and preferences for eSIM (C) on eUICC 114-1 in the source device 110 can be transferred to eSIM(C') on eUICC 114-2 in the target device 150. In some embodiments, a user selects which of one or more eSIMs on the source device 110, e.g., eSIM(C), to transfer to the target device 150, and eSIMs that are not selected, e.g., eSIM(B), can be not transferred to the target device 150. In some embodiments, preferences for a selected set of SIMs/eSIMs of a source device 110 are transferred to a set of corresponding SIMs/eSIMs on a target device 150, where correspondence can be based on identifier values, e.g., ICCID values and/or MSISDN values, at the target device 150 for SIMs/eSIMs that transfer matching identifier values for corresponding SIMs/eSIMs at the source device 110. In some embodiments (not shown), identifier values do not necessarily match between SIMs/eSIMs of the source device 110 and SIMs/eSIMs of the target device 150, and the user maps SIM/eSIMs of the source device 110 to corresponding SIM/eSIMs at the target device 150, and preferences transfer according to a mapping provided by the user.

Figure 4E:
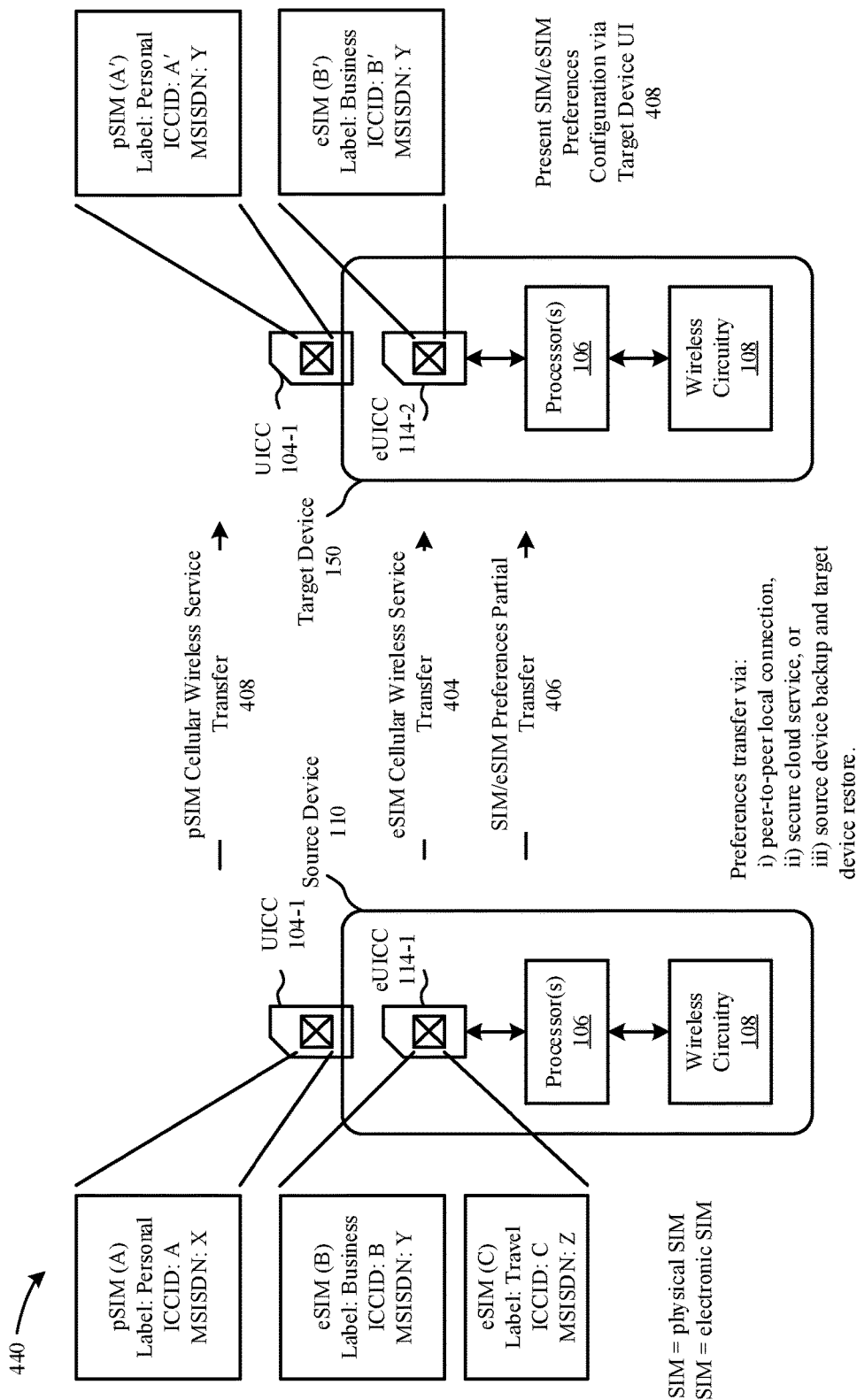

FIG. 4E illustrates a diagram 440 in which a user transfers cellular wireless services and preferences for pSIM(A) and eSIM(B) from the source device 110 to pSIM(A') and eSIM(B') at the target device 150, where pSIM(A') and pSIM(A) do not share the same ICCID value of the same MSISDN value. The user can explicitly choose to move a cellular wireless service from a first SIM that uses a first MSISDN value at the source device 110 to a different SIM that uses a second, different MSISDN value at the target device 150, e.g., when seeking to change phone numbers, while retaining the rest of the characteristics of the cellular wireless service. Preferences can also be transferred for pSIM(A) to pSIM(A'). Example preferences that can transfer include a label, contacts to label mappings, voice/data application usage, mobile-originated voice and data preferences, etc. The preferences can transfer even though the ICCID values and the MSISDN values of the pSIMs do not match at the source device 110 and the target device 150.

In some embodiments, preferences for active SIMs/eSIMs can transfer from a source device 110 to a target device 150, while preferences for inactive SIMs/eSIMs may not transfer. In some embodiments, preferences for both active SIMs/eSIMs and inactive SIMs/eSIMs transfer according to which SIMs/eSIMs have their cellular wireless services transferred between devices. In some embodiments, preferences for SIMs/eSIMs transfer only when selected by a user for transfer, while preferences for unselected SIMs/eSIMs do not transfer. In some embodiments, when transfer of preferences for a set of SIMs/eSIMs between devices is ambiguous as to how to apply the preferences at the target device 150, a user interface can be presented via an interface of the source device 110 and/or via an interface of the target device 150 to allow the user to determine how to map preferences and/or to enter new preferences for one or more SIMs/eSIMs of the target device 150. In some embodiments, preferences may transfer for some but not all of a set of selected SIMs/eSIMs for transfer, and a user interface can be presented via an interface of the source device 110 or via an interface of the target device 150 to allow a user to configure preferences for those SIMs/eSIMs of the target device 150 for which preferences did not transfer.

FIGS. 5A through 5F illustrate exemplary scenarios for transfer of preferences associated with SIMs/eSIMs that are transferred from a source device 110 to a target device 150. In some embodiments, source preferences from one or more source SIM/eSIMs may be applied to one or more target SIM/eSIMs. In some embodiments, source preferences may be applied to one or more target SIMs/eSIMs that are enabled on the target device 150, while source preferences for one or more target SIMs/eSIMs that are disabled on the target device 150 are not applied. In some embodiments, source preferences may be applied to one or more transferred SIMs/eSIMs, including enabled SIMs/eSIMs and/or disabled SIMs/eSIMs. In some embodiments, source preferences are applied to one or more target SIMs/eSIMs based on matching identifiers of the target SIMs/eSIMs to identifiers for corresponding source SIMs/eSIMs. Representative identifiers or means for matching identifiers include MSISDN values, ICCID values, and/or mappings of source ICCID values to target ICCID values. In some embodiments, source preferences for one or more target SIMs/eSIMs are transferred, and a user interface is presented for one or more additional target SIMs/eSIMs for which a user can enter preferences. The user interface can be presented i) during transfer of the SIMs/eSIMs, ii) during transfer of the preferences for the transferred SIMs/eSIMs, and/or iii) after transfer of the preferences for the transferred SIMs/eSIMs. In some embodiments, some source preferences for one or more target SIMs/eSIMs are transferred, while additional source preferences for the one or more target SIMs/eSIMs are not transferred, e.g., the preferences for the one or more target SIMs/eSIMs transfer in part, while additional preferences can be entered by a user via a user interface during the transfer or later.

Figure 5A:
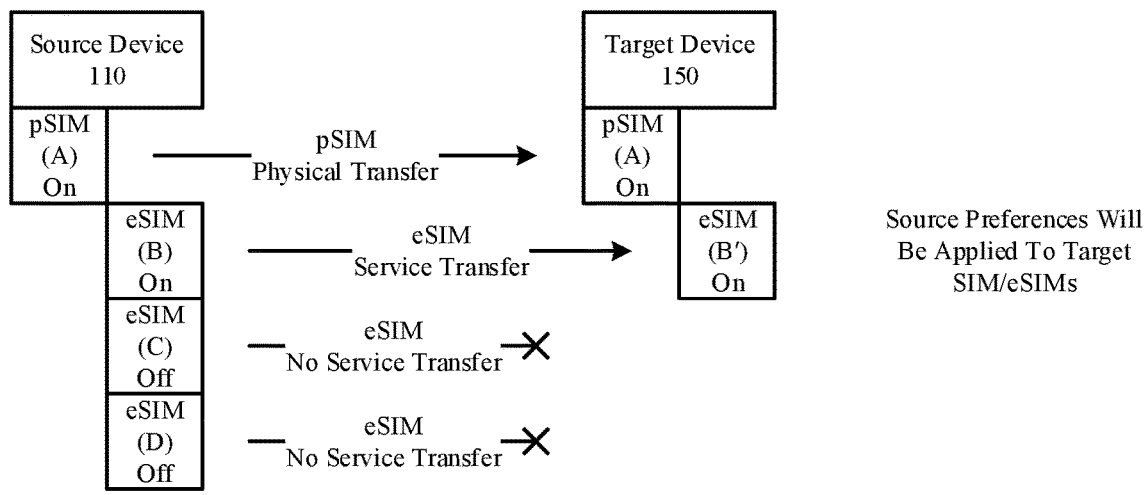
FIGS. 5A through 5F illustrate exemplary scenarios for transfer of preferences associated with SIMs/eSIMs that are transferred from a source device to a target device, according to some embodiments.

FIG. 5A illustrates a diagram 500 in which a physical SIM (e.g., embodied on a UICC), namely pSIM(A), is physically transferred from the source device 110 to the target device 150, while cellular wireless service for one of several eSIMs, namely eSIM(B), is transferred from the source device 110 to eSIM(B') at the target device 150. At the target device 150, pSIM(A) shares the same ICCID as pSIM(A) at the source device 110 before transfer (as it's the same physical SIM). At the target device 150, eSIM(B') matches to eSIM(B) at source device 110, e.g., based on sharing the same MSIDSN or based on a mapping of the MSISDN of eSIM(B) to the MSISDN of eSIM(B'). Cellular wireless services for eSIM(C) and eSIM(D) at the source device 110 are not transferred to the target device 150. In this scenario, preferences for pSIM(A) and eSIM(B) will be applied to pSIM(A) and eSIM(B') at the target device 150. In some embodiments, source preferences for pSIM(A) and eSIM (B') are applied at the target device 150 irrespective of whether disabled eSIM(C) and/or disabled eSIM(D) are transferred from the source device 110 to the target device 150.

Figure 5B:
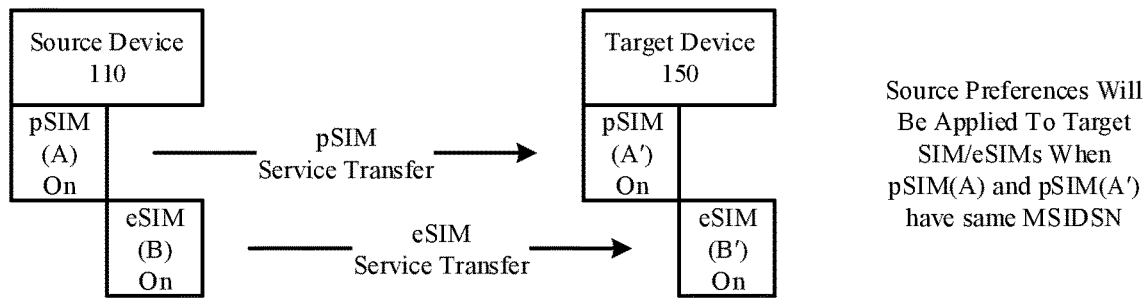

FIG. 5B illustrates a diagram 510 in which cellular wireless services for pSIM(A) and eSIM(B) of the source device 110 are transferred to pSIM(A') and eSIM(B') respectively on the target device 150. In this scenario, in some embodiments, preferences for pSIM(A) and eSIM(B) may be applied to pSIM(A') and eSIM(B') when both pSIM(A) and pSIM(A') share identical MSISDN values. (It is noted that cellular wireless service transfer for eSIM(B) to eSIM (B') can result in the same MSISDN value being re-used at the target device 150 as was used previously at the source device 110.) In some embodiments, when pSIM(A) and pSIM(A') do not share identical MSISDN values, a user can specify, e.g., via an interface of the source device 110 and/or via an interface of the target device 150, to map the preferences of pSIM(A) to pSIM(A'), in which case preferences may be applied based on the user indication. In some embodiments, preferences from eSIM(B) will be applied to eSIM(B') automatically independent of whether MSISDN values match between pSIM(A) and pSIM(A'). In some embodiments, a user may specify to transfer preferences for eSIM(B) to eSIM(B'), e.g., via an interface of the source device 110 and/or via an interface of the target device 150.

Figure 5C:
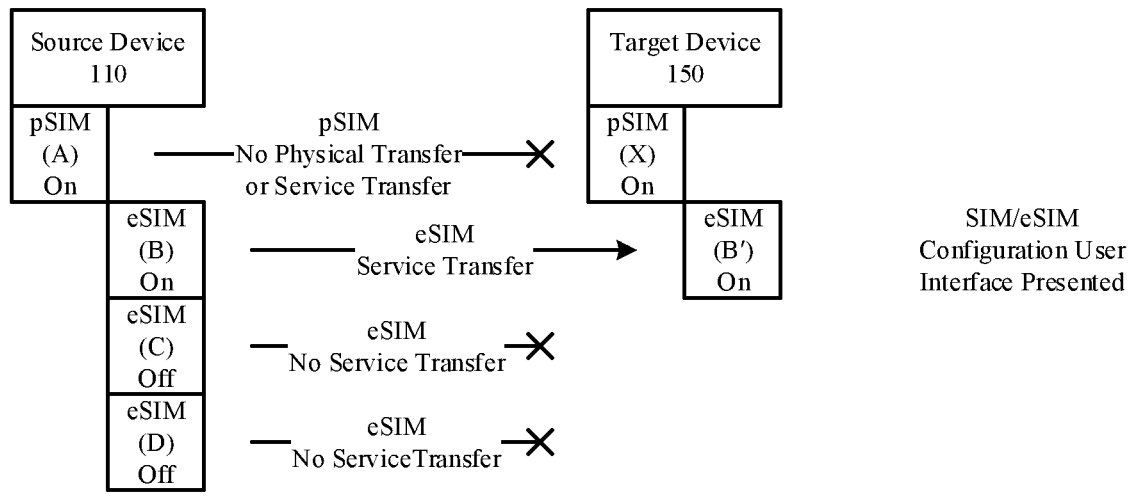

FIG. 5C illustrates a diagram 520 in which cellular wireless service for only one SIM/eSIM, namely eSIM(B), transfers from the source device 110 to the target device 150, while cellular wireless services for pSIM(A), eSIM(C), and eSIM(D) do not transfer to the target device 150 and instead a new pSIM(X) is used at the target device 150. In some embodiments, a user interface is presented via an interface of the source device 110 and/or via an interface of the target device 150 to allow a user to configure preferences for pSIM(X) and/or eSIM(B'). In some embodiments, a user is presented an option as to whether to transfer preferences as used at the source device 110 for pSIM(A) and/or eSIM(B) to apply to pSIM(X) and/or eSIM(B') respectively. In some embodiments, preferences for eSIM(B') are applied at the target device 150 based on preferences for eSIM(B) at the source device 110, and a user interface is presented during or after transfer to allow the user to configure preferences for pSIM(X).

Figure 5D:
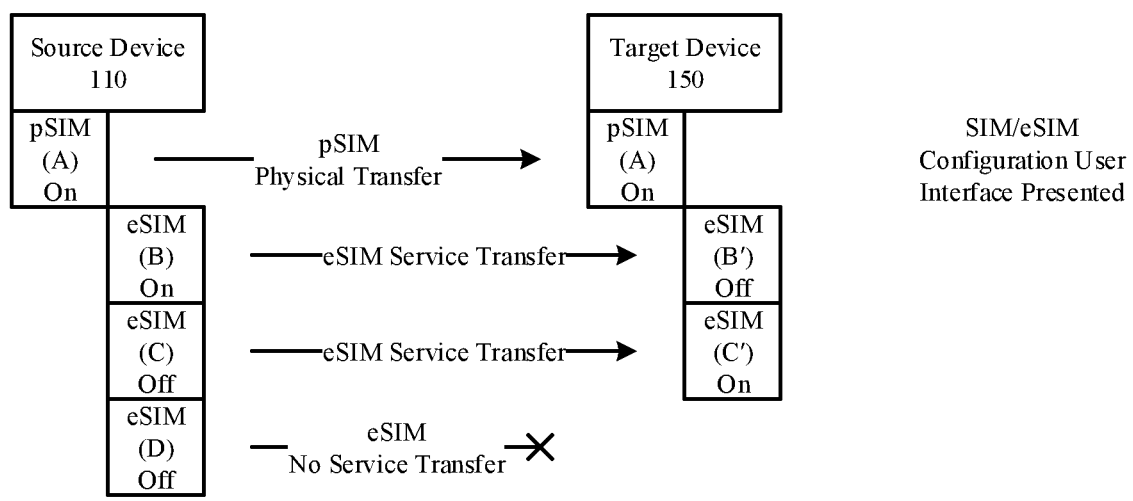

FIG. 5D illustrates a diagram 530 in which a physical SIM (e.g., embodied on a UICC) is physically transferred from the source device 110 to the target device 150, while cellular wireless services for multiple eSIMs, namely eSIM(B) and eSIM(C), are transferred from the source device 110 to eSIM(B') and eSIM(C') at the target device 150. In the scenario of FIG. 5D, a state of the eSIMs at the target device 150 does not match a state of the corresponding eSIMs at the source device 110. In some embodiments, a user interface is presented at the target device 150 to allow for configuration of the SIM/eSIMs of the target device 150. In some embodiments, preferences for pSIM(A) may be transferred automatically, while preferences for eSIM(B) and eSIM(C) may be transferred based on input from a user via an interface of the source device 110 and/or via an interface of the target device 150. In some embodiments, a subset of preferences for pSIM(A), eSIM(B), and eSIM(C) are transferred, while additional preferences that do not transfer may be configured via an interface of the target device 150 and/or via an interface of the source device 110 during or after transfer of cellular wireless services for pSIM(A), eSIM(B), and eSIM (C). As an example of ambiguity in transferring preferences for cellular wireless services for the scenario illustrated in FIG. 5D, if eSIM(B) is selected as preferred for mobile-originated voice connections or preferred for data connections at the source device 110, it is not clear which of the active SIMs/eSIMs at the target device 150, i.e., which of pSIM(A) and eSIM(C'), the user intends to be preferred for voice service use or for data service use at the target device 150, as eSIM(B') is indicated as inactive (and therefore unable to be selected as preferred for mobile-originated voice connections or for data connections while in the inactive state).

Figure 5E:
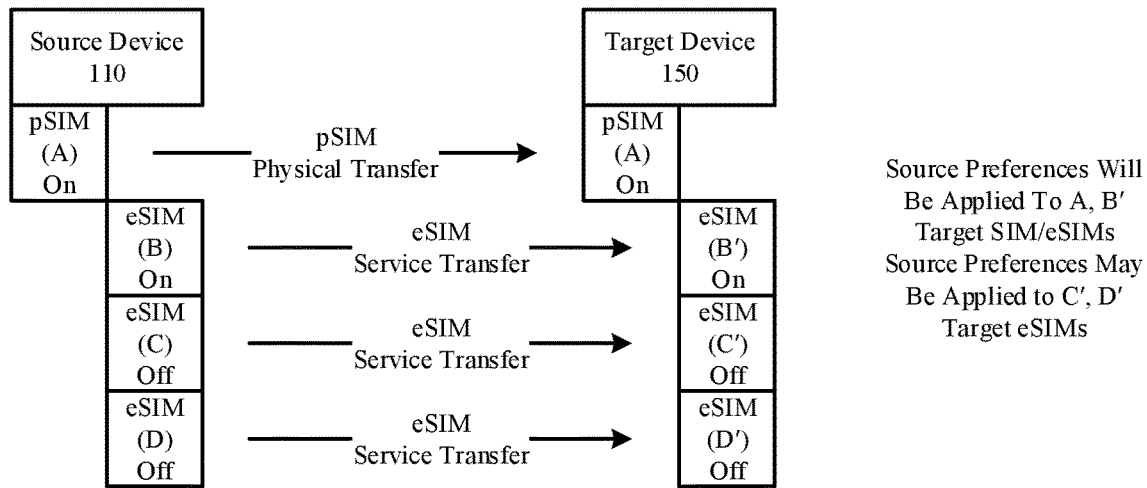

FIG. 5E illustrates a diagram 540 in which a physical SIM (e.g., embodied on a UICC), namely pSIM(A), is physically transferred from the source device 110 to the target device 150, while cellular wireless services for several eSIMs, namely eSIM(B), eSIM(C), and eSIM(D), are transferred from the source device 110 to eSIM(B'), eSIM(C'), and eSIM(D') respectively at the target device 150. At the target device 150, eSIM(B') can share the same MSISDN as used by eSIM(B) before cellular wireless service transfer from the source device 110. At the source device 110, eSIM(C) and eSIM(D) are disabled when transfer occurs, while at the target device 150, eSIM(C') and eSIM(D') are also disabled when transfer occurs. In this scenario, preferences for pSIM (A) and eSIM(B) will be applied to pSIM(A) and eSIM(B') at the target device 150, when eSIM(B') matches to eSIM (B). In some embodiments, when SIMs/eSIMs match, their preferences transfer, while for SIMs/eSIMs that do not match, their preferences do not transfer. Matching SIMs/eSIMs can be based on matching ICCID values, mapping of ICCID values and/or matching MSISDN values. In some embodiments, preferences for one or more disabled eSIMs, e.g., eSIM(C) and/or eSIM(D), transfer to corresponding disabled eSIMs, e.g., eSIM(C') and/or eSIM(D'), either automatically or based on user input to transfer the preferences. In some embodiments, preferences for one or more disabled eSIMs do not transfer and a user interface of the target device 150 is presented during or after transfer of the eSIMs (and/or during after transfer of preferences for other SIMs/eSIMs to the target device 150) to allow the user to enter preferences for one or more of the transferred disabled eSIMs.

Figure 5F:
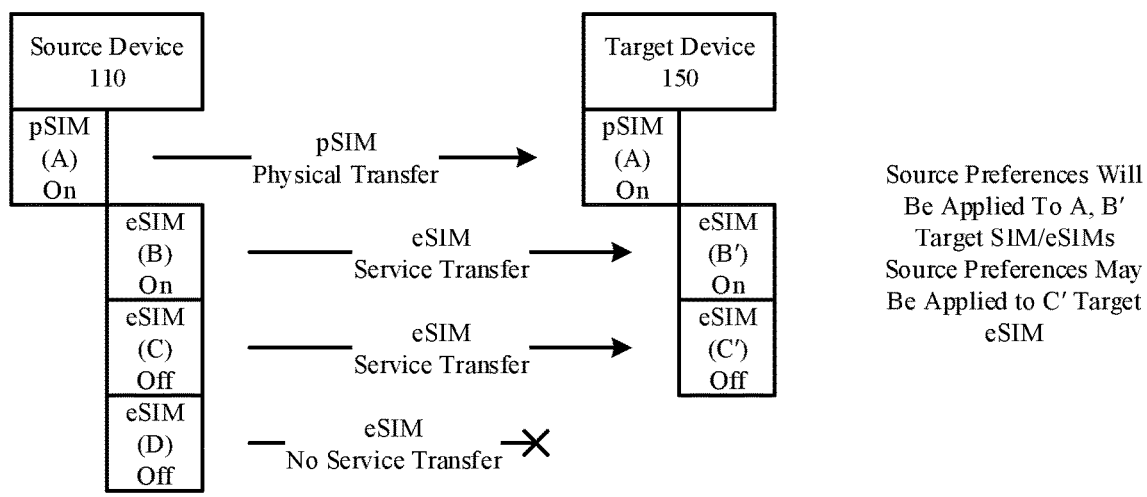

FIG. 5F illustrates a diagram 550 in which a physical SIM (e.g., embodied on a UICC), namely pSIM(A), is physically transferred from the source device 110 to the target device 150, while cellular wireless services for eSIM(B) and eSIM (C) are transferred from the source device 110 to eSIM(B') and eSIM(C') respectively at the target device 150. In the example shown in FIG. cellular wireless service for eSIM (D) is not transferred to the target device 150. Both eSIM(C) and eSIM(D) at the source device 110 and eSIM(C') at the target device 150 are disabled. As the transferred physical SIM, pSIM(A), will have the same MSISDN and ICCID at the target device 150, source preferences for pSIM(A) will be applied at the target device 150. When eSIM(B') at the target device 150 matches eSIM(B) at the source device 110, e.g., based on matching MSISDN values and/or a mapping of MSISDN values from the source device 110 to the target device 150, preferences for eSIM(B') will be applied. In some embodiments, preferences for the disabled eSIM(C') may be applied based on matching of eSIM(C') to eSIM(C) and/or based on user input. In some embodiments, prefer-ences for disabled eSIM(C') are not applied, and a user interface may be presented during or after transfer of service and/or preferences for eSIM(C) to allow the user to enter preferences for eSIM(C'). In some embodiments, a user interface is presented at source device 110 and/or at target device 150 to allow a user to specify whether preferences transfer for eSIM(C) to eSIM(C').

Representative Exemplary Apparatus

Figure 6:
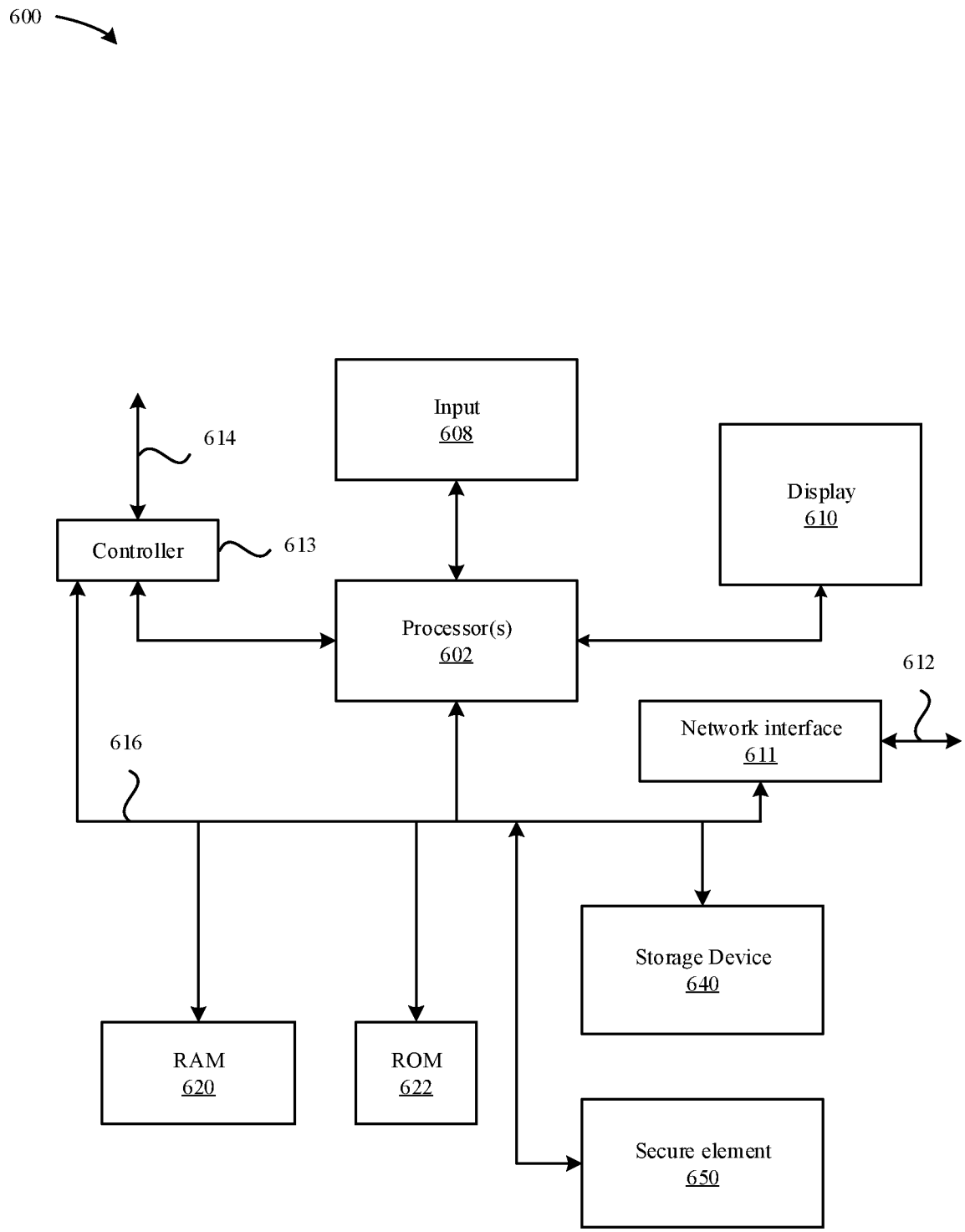
FIG. 6 illustrates a block diagram of exemplary elements of a mobile wireless device, according to some embodiments.

FIG. 6 illustrates in block diagram format an exemplary computing device 600 that can be used to implement the various components and techniques described herein, according to some embodiments. In particular, the detailed view of the exemplary computing device 600 illustrates various components that can be included in the source device 110 and/or the target device 150. As shown in FIG. 6, the computing device 600 can include one or more processors 602 that represent one or more microprocessors or controllers for controlling the overall operation of computing device 600. The one or more processors 602 of computing device 600 can correspond to the one or more processors 106 for the source device 110 and/or target device 150. In some embodiments, the computing device 600 can also include a user input device 608 that allows a user of the computing device 600 to interact with the computing device 600. For example, in some embodiments, the user input device 608 can take a variety of forms, such as a button, keypad, dial, touch screen, audio input interface, visual/image capture input interface, input in the form of sensor data, etc. In some embodiments, the computing device 600 can include a display 610 (screen display) that can be controlled by the one or more processors 602 to display information to the user (for example, information relating to incoming, outgoing, or active communication session). A data bus 616 can facilitate data transfer between at least a storage device 640, the one or more processors 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include wireless circuitry 108, such as a wireless transceiver and/or a baseband processor, that can be used to communicate with one or more cellular wireless networks 130 and/or with non-cellular wireless networks. The computing device 600 can also include a secure element 650. The secure element 650 can include an eUICC and/or a UICC.

The computing device 600 also includes a storage device 640, which can include a single storage or a plurality of storages (e.g., hard drives, memory modules), and includes a storage management module that manages one or more partitions within the storage device 640. In some embodiments, storage device 640 can include flash memory, semi-conductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for cellular wireless service preferences transfer, the method comprising:
   at a source device:
   initiating transfer of cellular wireless services for a physical subscriber identity module (pSIM) or an electronic SIM (eSIM) from the source device to a target device;
   determining whether a value for the pSIM or eSIM of the source device matches to a corresponding value of a corresponding pSIM or eSIM of the target device; and
   when the value matches, providing a set of preferences for the pSIM or eSIM of the source device to the target device,
   wherein matching is based at least in part on:
   a mapping of a first integrated circuit card identifier (ICCID) value of the pSIM or eSIM of the source device to a second ICCID value of the pSIM or eSIM of the target device, and
   activation states for the pSIM or eSIM of the source device and for the pSIM or eSIM of the target device, wherein an activation state includes an active/on state or an inactive/off state.

2. The method of claim 1, further comprising:
   by the source device:
   when the value does not match, obtaining, via an interface of the source device, a configuration of preferences for the pSIM or eSIM of the target device.

3. The method of claim 1, wherein the transfer of cellular wireless service preferences is initiated in response to transfer of a universal integrated circuit card (UICC) storing the pSIM from the source device to the target device.

4. The method of claim 1, wherein the transfer of cellular wireless service preferences is initiated in response to transfer of cellular wireless service associated with the eSIM of the source device to the eSIM of the target device.

5. The method of claim 1, wherein the first ICCID value of the pSIM or eSIM of the source device and the second ICCID value of the pSIM or eSIM of the target device are not identical.

6. The method of claim 1, the set of preferences for the pSIM or eSIM of the source device are provided to the target device via a peer-to-peer connection between the source device and the target device.

7. The method of claim 1, the set of preferences for the pSIM or eSIM of the source device are provided to the target device via a secure cloud service.

8. The method of claim 1, wherein set of preferences for the pSIM or eSIM of the target device are provided as part of a source device backup to target device restore process.

9. The method of claim 8, wherein the target device and the source device share a common user account at a secure cloud-based service used for the source device backup to target device restore process.

10. The method of claim 1, further comprising:
by the source device:
obtaining, via an interface of the source device, the mapping of the first ICCID value of the pSIM or eSIM of the source device to the second ICCID value of the pSIM or eSIM of the target device,
wherein the first ICCID value and the second ICCID value are not identical.

11. The method of claim 1, further comprising:
by the source device:
storing a cache of preferences for one or more SIMS and/or eSIMs of the source device; and
updating the cache of preferences responsive to one or more of:
insertion of a universal integrated circuit card (UICC) including a pSIM to the source device; or
enablement of an eSIM at the source device.

12. The method of claim 11, further comprising:
by the source device:
refraining from updating the cache of preferences responsive to one or more of:
removal of a universal integrated circuit card (UICC) including a pSIM from the source device;
disablement of a pSIM at the source device;
disablement of an eSIM at the source; or
deletion of an eSIM at the source device.

13. The method of claim 11, further comprising:
by the source device:
updating the cache of preferences for a pSIM associated with UICC removed from the source device after receipt of an indication that the UICC should be disassociated from the source device.

14. The method of claim 11, further comprising:
by the source device:
updating the cache of preferences for an eSIM deleted from the source device after receipt of an indication that the eSIM should be permanently deleted from the source device.

15. An apparatus configured for operation in a source device, the apparatus comprising:
one or more processors; and
a memory communicatively coupled to the one or more processors and storing instructions that, when executed by the one or more processors, configure the source device to:
initiate transfer of cellular wireless service preferences, from the source device to a target device, for a physical subscriber identity module (eSIM) or an electronic SIM (eSIM) of the source device;
determine whether a value for the pSIM or eSIM of the source device matches to a corresponding value of a corresponding pSIM or eSIM of the target device; and
when the value matches, provide a set of preferences for the pSIM or eSIM of the source device to the target device,
wherein matching is based at least in part on:
a mapping of a first integrated circuit card identifier (ICCID) value of the pSIM or eSIM of the source device to a second ICCID value of the pSIM or eSIM of the target device; and
activation states for the pSIM or eSIM of the source device and for the pSIM or eSIM of the target device, wherein an activation state includes an active/on state or an inactive/off state.

16. The apparatus of claim 15, wherein the source device is further configured to:
store a cache of preferences for one or more SIMs and/or eSIMs of the source device; and
update the cache of preferences responsive to one or more of:
insertion of a universal integrated circuit card (UICC) including a pSIM to the source device; or
enablement of an eSIM at the source device.

17. The apparatus of claim 16, wherein the source device is further configured to:
refrain from updating the cache of preferences responsive to one or more of:
removal of a universal integrated circuit card (UICC) including a pSIM from the source device;
disablement of a pSIM at the source device;
disablement of an eSIM at the source; or
deletion of an eSIM at the source device.

18. The apparatus of claim 16, wherein the source device is further configured to:
update the cache of preferences for a pSIM associated with UICC removed from the source device after receipt of an indication that the UICC should be disassociated from the source device.

19. The apparatus of claim 16, wherein the source device is further configured to:
update the cache of preferences for an eSIM deleted from the source device after receipt of an indication that the eSIM should be permanently deleted from the source device.

20. A source device configured for cellular wireless service preferences transfer, the source device comprising:
wireless circuitry comprising one or more antennas;
one or more processors communicatively coupled to the wireless circuitry; and
a memory communicatively coupled to the one or more processors and storing instructions that, when executed by the one or more processors, configure the source device to:
initiate transfer of cellular wireless service preferences, from the source device to a target device, for a physical subscriber identity module (pSIM) or an electronic SIM (eSIM) of the source device;
determine whether a value for the pSIM or eSIM of the source device matches to a corresponding value of a corresponding pSIM or eSIM of the target device; and
when the value matches, provide a set of preferences for the pSIM or eSIM of the source device to the target device,
wherein matching is based at least in part on:
a mapping of a first integrated circuit card identifier (ICCID) value of the pSIM or eSIM of the source device to a second ICCID value of the pSIM or eSIM of the target device; and
activation states for the pSIM or eSIM of the source device and for the pSIM or eSIM of the target device, wherein an activation state includes an active/on state or an inactive/off state.

* * * * *